United States Patent [19]

Kiss

[11] Patent Number: 4,784,903
[45] Date of Patent: Nov. 15, 1988

[54] FIBROUS MAT FOR HOT MOLDING TO MOLDED ARTICLES

[76] Inventor: Gunter H. Kiss, Bahnhofstrasse 15, D-6443 Sontra 1, Fed. Rep. of Germany

[21] Appl. No.: 90,663

[22] Filed: Aug. 28, 1987

[30] Foreign Application Priority Data

Aug. 29, 1986 [DE] Fed. Rep. of Germany ....... 3629891

[51] Int. Cl.$^4$ ................................................ B32B 5/06
[52] U.S. Cl. .................................... 428/299; 428/284; 428/285; 428/286; 428/287; 428/297; 428/298; 428/340
[58] Field of Search .............. 428/284, 285, 286, 287, 428/297, 298, 299, 340

[56] References Cited

U.S. PATENT DOCUMENTS

| | | | |
|---|---|---|---|
| 4,292,360 | 9/1981 | Riedel et al. | 428/298 |
| 4,413,031 | 11/1983 | Poppelreuter | 428/298 |
| 4,418,113 | 11/1983 | Kawashimo et al. | 428/298 |
| 4,596,736 | 6/1986 | Eichhorn et al. | 428/298 |
| 4,680,219 | 7/1987 | Vernois et al. | 428/298 |

*Primary Examiner*—James J. Bell
*Attorney, Agent, or Firm*—Marshall & Melhorn

[57] ABSTRACT

A fibrous mat for hot molding to molded articles is described. This comprises a firm sandwich or union formed from a central tangled fiber layer subject to the action of a binder and in each case one heatproof, binder-containing tangled fiber surface layer on the two major surfaces of the central layer. The surface layer, at least of the unmolded mat, has a greater tensile strength than the central layer and in the case of a mat molded to the molded article is in the form of a moisture-regulating membrane. The weight per unit area of the binder-free portion of the heatproof tangled fibers of the surface layer is 10 to 100 g/m$^2$ and the individual tangled fibers are coated in fiber-enveloping manner with 100 to 200% by weight, based on said weight per unit area, of a binder already precondensed prior to the molding of the fibrous mat, in such a way that the diameter ratio between the coated and the previously uncoated tangled fibers of the surface layer is between 1.4 and 1.75.

8 Claims, No Drawings

FIBROUS MAT FOR HOT MOLDING TO MOLDED ARTICLES

BACKGROUND OF THE INVENTION

The present invention relates generally to a fibrous mat for hot molding to molded articles.

Multilayer fibrous mats, particularly those with special surface coatings are known. In particular, a multilayer fibrous mat for producing molded articles in a press mold by exposing the fibrous mat to pressure and elevated temperature and formed from cellulose, lignocellulose or similar fibers, whose two surface layers are also formed from a tangled fiber fleece and provided with at least a proportion of thermosetting synthetic resins, is known. A thermoplastic binder-containing central tangled fiber layer and two outer surface layers provided with thermosetting binders are produced by the layerwise placing of the mat material on a conveyor belt and in that state molded to molded articles, which simultaneously forms a firm union or sandwich of said multilayer arrangement. See, for example, German Patent No. P 32 33 385.

However, it has been found that the additional gluing of the surface layers with a thermosetting material which takes place in this process according to the partial flow principle during the production of the mat and during molding is at least partly absorbed by the absorbent central layer. This is disadvantageous in that in such known three-layer mats, the thermal and mechanical surface treatment is lost through the thermosetting binder used therein undersirably migrating into the central layer. This effect can only be compensated by the addition of larger quantities of thermosetting binder being applied to the surface layer fibers, which would make the desired end product much more expensive.

Another known process for producing insulating plates, using mineral fibers as a basis, can be realized when the non-woven fabric is applied to a moving surface fiber fleece during production, so that during compression the insulating plate is joined to the fleece carrier (DE.OS No. 28 53 316).

In product-dependent manner, particular attention has long been paid to the processing of wood fiber materials of the present type and, non-woven fabrics comprising natural or mineral fibers and the like to plates or three-dimensionally shaped products. The nature of the surface treatment for these products can range from the simplest resin enrichment, primers or varnishes to printing and lining with films or lamination with plastics and the like.

The application of surface layers to supporting central layers, either in the form of special surface laeer gluing treatments, additional lining material or the like, generally leads to the desired improved surface characteristics, but is generally also linked with a sealing of the surface in the sense of being impermeable to gases or liquids. This can be disadvantageous in many cases and particularly when the processing of such mats to molded articles excludes certain procedures or other technically simply performable process steps. Reference is made to this in connection with the production-favorable vacuum deep drawing process for coordinating such molded articles with thermoplastic films, as well as to certain characteristics of completely molded parts, which are considered to be more advantageous when used as linings in passenger areas of motor vehicles if they ensure a certain air permeability and moisture absorption, which further significantly improves the climatic conditions within such passenger areas.

SUMMARY OF THE INVENTION

The thrust of the present invention is therefore to develop a three-layer fibrous mat of the aforementioned type that, with the minimum use of higher grade fiber and binder materials, and minimum manufacturing expenditure, contributes to the provision of molded articles, whose surface is both insensitive to wetness and breaths moisture, and whose thermal, chemical and physical characteristics can compete with those of comparable surface-sealing coatings or coverings.

According to the invention this problem is solved by a fibrous mat comprising acentral tangled fiber layer treated with a binder, and a heat resistant, binder-containing tangled fiber surface layer overlayed on the two major surfaces of the central layer The two surface layers form a firm sandwich with the central layer, characterized in that the surface layers of at least the unmolded mat have a higher tensile strength than that of the central layers, and the surface layers of the mat molded to the molded article is constructed as a moisture regulating membrane.

The surface layers typically have a weight per unit area of uncoated binder-free heat resistant tangled fibers in the order of 10 to 100 $g/m^2$, and subsequent to being coated with a precondensed binder, the fibers achieve a 1.4 to 1.75 diameter ratio between the coated and previously uncoated fibers, based on this the proportion by weight per unit area, ($g/m^2$) of the precondensed binder to the uncoated-fibrous material is 1–2:1. The surface layer at least in the unmolded phase has a tensile strength higher than the central layer, and possesses the characteristics of a moisture regulating membrane in the molded phase.

DETAILED DESCRIPTION OF THE PREFERRED EMBODIMENT

The present invention is based on surface layer fibers which can be substantially of a random nature. These fibers can be in the form of organic i.e wood or cotton or inorganic i.e. polyester or glass fibers and have a natural or synthetic origin, whereby no requirements are made with respect to their moisture absorptivity or sensitivity to other environmental influences. In addition, they need not be inexpensive to manufacture, because only small amounts are used compared with the supporting central layer (weight per unit area of the total mat, as a function of application, 1000 to 2000 $g/m^2$).

The presently required, high-grade surface sealing, particularly with respect to high thermal stability, is ensured by coating the adequate length of the present individual fibers of the tangled fiber surface layers, preferably in the form of staple fibers, with a thermosetting binder, for example a phenolic resin, in a given ratio of the fiber diameter to the binder coating. Simultaneously it is possible to ensure gas permeability and a moisture permeability determinable by the surface density of the surface layer on the finished molding. This is because the individual fibers coated with a thermosetting binder within the tangled fiber fleece form between them homogeneously distributed, screen-like passages. Due to the fact that the fiber-enveloping binder is partly precondensed, there is no migration of binder into the central, relatively absorbent tangled fiber layer, which is subject to the action of the thermoplastic binder such as bitumen, so that there is no need to thin the binder in the surface area and its positive characteristics have their full effect.

As a result of precondensing, the viscosity of the thermosetting binder in the surface layers can also be previously defined for the molding process. The quasi-moisture absorption possibility of the central tangled fiber layer through the surface layers actng in membrane-like manner can be precisely "dosed" and adjusted in optimum manner to the individual application. The heat-resistant enveloping of the surface layer fibers by the binder only seals the individual fibers in a moisture-tight manner, but not the tangled fiber fleece formed therefrom.

During molding, the fibers are not in part dissolved again and do not come into direct contact with the hot surface of the mold parts. They retain their predetermined strength characteristics substantially independent of the parameters for optimum molding. The precondensed binders used for enveloping the individual fibers of the surface layers have a viscosity such that there is not complete sealing of the tangled fiber layer, as is the case with film linings. The moisture-regulating membrane action of the surface layers equals out high temperature fluctuations and moisture changes within the passenger area of cars lined with molded articles made from such multilayer mats in a manner pleasant for the occupants. It has surprisingly been found with the present invention that even if there is prolonged wetness, and moisture absorption in the central layer, e.g. of lignocellulose fibers, has taken place to a relatively high extent, the thickness swelling of the molded article is approximately one decimal power lower than with comparable molded articles which in place of the membrane-like surface layers, either carry film seals or are otherwise completely air and moisture-tight as a result of binders or coatings. Even if the fibers of the central layer are sensitive to moisture, the moisture-regulating membrane makes it possible to so regulate and keep low the moisture absorption of the molded article, that there are no dimensional changes due to swelling if moisture occurs in superfluidity on the molded article.

Due to the fact that the original characteristics of the individual, completely sealed fibers of the surface layer fleeces are fully retained and in particular due to the fact that the high-grade thermosetting gluing of the surface layers remains almost completely therein and does not partly diffuse into the central layer, the molded articles have excellent strength characteristics. In particular a high impact strength, as well as bending strength and bursting limit values, which are otherwise only attainable when much higher thermosetting binder proportions are used. Following the molding of the surface layers to the tangled fiber layer, the said surface layers have a microporosity which. in per se contradictory manner. and despite a relatively high absorption capacity for moisture, ensures a highly stable accuracy to size of the molded article.

The precondensed. thermosetting binder of the surface layer joins the fibers of said surface layer at their crossing points, so that the surface layers in the unmolded state can be given a higher tensile strength than the central layer. Thus, during the molding of the mat to the molded article, the shaping or deforming process is stabilized, particularly if, such as in the case with wood fiber mats, the mat is plasticized by evaporation during which the thermoplastically bound fibers of the central layer largely lose their binding, whereas the binding characteristics of the precondensate of the surface layers in the present invention are largely retained. The permeability of the surface layer makes it possible, to retain conventional technology for wood fiber mats and also in the case of extended shaping possibilities, improved molded article characteristics and reduce waste due to the stabilizing action of the surface layers on the shaping process.

It is advantageous to use plastic fibers such as polyester for the surface layer fibers which have a softening point above 200° C. Unlike many mineral fibers, these plastic fibers have high lateral strength characteristics and are not brittle, even at low temperatures, so that molded articles with high impact strength in a very wide temperature range are obtained. If increased demands are made on the strength and bending resistance of the parts, it may be appropriate for the surface layers to be at least partly formed from glass fibers, apart from ceramic fibers.

The binding strength and impact strength of the molded articles can also be improved if at least part of the fibers of the surface layer are natural fibers such as wood, cotton and leather. This is because natural fibers generally have an increased moisture absorption during storage. It is generally appropriate to pretreat them with hydrophobing agents such as hydroxyacetic acid prior to binder addition and precondensation. Improved strength characteristics of the molded articles can be obtained, in particular, if the fibers forming the tangled fiber fleeces of the surface layers, are on average longer than 20 mm.

On molding the fibrous mats to molded articles, the tangled fibers of the surface layers are further bound and strengthened by the precondensed resin in the fiber crossing points to the extend that this has not taken place through the precondensation and are now able to absorb tensile forces to an even greater extend and futhermore improve the mechanical characteristics of the molded articles.

Virtually all known fiber types can be used for producing the central layers, providing that the temperature at which the fibrous mat is molded to molded articles can be borne by the fibers without suffering damage. This aspect also applies with respect to the binders used in the central layer. Generally lower demands are made on the quality of the fibers and binder of the central layer than for comparable known fibrous mats, particularly because the moisture-regulating characteristics of the surface layers also permit the use of more moisture sensitive fibers.

The increased viscosity of the fiber-enveloping binder during final molding not only produces the desired microporosity, but also a fiber diameter-corresponding surface roughness which, in conjunction with the microporosity, ensures a better adhering of surface finishes and laminating adhesives.

If heat-resistant, crosslinked coupling agents are used between the surface layers and the central fibrous fleece mat, the desired gas permeability can suffer. This can be prevented when the coupling agent such as phenolic resins are applied in the form of point, line, screen or grating-like patterns, and the surface proportion not wetted by the coupling agent being greater than 15%. This makes it possible to achieve a satisfactory gas permeability of the coupling agent layers, without the heat-resistant, surface adhesion of the surface layers being impaired. Thus, tensile forces during shaping can be transferred between the surface layers and the central fibrous fleece mat. The pattern-like coating of the coupling agent can be carried out without difficulty by perse known pressure rollers or other prior art means, such as pressure screens and the like. The "lattice constants" of the adhesive pattern can be between a few millimeters and a few centimeters, and is a function of the fiber type, length and deformation problem.

What is claimed is:

1. A fibrous mat for hot molding to molded articles comprising:

a central layer of a tangled fibrous material and an associated binder, said layer having opposed extended surfaces; and at least one surface layer of a tangled fibrous material and an associated binder in superimposed contact with one of the extended surfaces of said central layer, the heat resistant fibrous material of said surface layer having a weight per unit area of 10 to 100 g/m² prior to the addition of the said associated binder, and subsequently being coated with a precondensed binder so as to achieve a 1.4 to 1.75 diameter ratio between the coated and previously uncoated fibers, the proportion by weight (g/m²) of the binder to the uncoated fibrous material in said surface layer being 1.2:1. said surface layer at least in the unmolded phase having a higher tensile strength than the central layer, and possessing the characteristics of a moisture regulating membrane in the molded phase.

2. A fibrous mat according to claim 1, wherein the fibrous material of said surface layer is comprised of a thermoplastic material having a softening point above 200° C.

3. A fibrous mat according to claim 2, wherein the thermoplastic material is a polyester.

4. A fibrous mat according to claim 1, wherein the fibrous material of said surface layer is at least in part glass fibers.

5. A fibrous mat according to claim 1, wherein fibrous material of said surface layer is at least in part composed of natural fibers such as wood or cotton, pretreated with hydrophobing agents such as hydroxyacetic acid prior to adding the binder and precondensation.

6. A fibrous mat according to at least one of the claims 1 through 4, wherein the average length of the fibrous material of said surface layer includes fibers of a length greater than 20 mm.

7. A fibrous mat according to claim 1, in which between the said heat resistant, binder-containing tangled fiber surface layers and the two major surfaces of the said central tangled fiber layer is provided a heat-resistant coupling agent in point, line grid, or grating-like distribution, the fibrous mat therein forming a sandwich with alternating layers and the sandwiched surfaces of the said fibrous mat which are not subjected to the action of the coupling agent being greater than 15%.

8. Fibrous mat for hot molding to molded articles, comprising a central tangled fiber layer treated with a binder and in each case one heatproof, binder-containing tangled fiber surface layer on the two surfaces of the central layer, the surface layers forming a firm sandwich with the central layer, characterized in that the surface layer of at least the unmolded mat has a higher tensile strength than the central layer and that said surface layer in the mat molded to the molded article is constructed as a moisture regulating membrane, the weight per unit area of the binder-free portion of the heatproof tangled fibers of the surface layer being 10 to 100 g/m² and the individual tangled fibers with a proportion of 100 to 200% by weight, based on this weight per unit area, are coated in fiber-enveloping manner with a binder already precondensed prior to the molding of the fibrous mat, so that the diameter ratio between the coated and uncoated tangled fibers of the surface layer is between 1.4 and 1.75.

* * * * *